(12) United States Patent
Sakai

(10) Patent No.: US 8,150,980 B2
(45) Date of Patent: Apr. 3, 2012

(54) COMMUNICATION APPARATUS AND METHOD THEREOF THAT DETERMINE COMMUNICATION PARTNER FOR PERFORMING AUTOMATIC SETTING PROCESS OF COMMUNICATION PARAMETER

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 12/174,321

(22) Filed: Jul. 16, 2008

(65) Prior Publication Data

US 2009/0037591 A1 Feb. 5, 2009

(30) Foreign Application Priority Data

Aug. 1, 2007 (JP) ................................. 2007-201099

(51) Int. Cl.
*G06F 15/16* (2006.01)

(52) U.S. Cl. ........ 709/228; 709/220; 709/221; 709/224; 370/338; 370/254; 455/455; 455/466

(58) Field of Classification Search .......... 709/220–221, 709/224, 228; 370/338, 254; 455/455, 466
See application file for complete search history.

(56) References Cited

U.S. PATENT DOCUMENTS

| 7,289,631 | B2 | 10/2007 | Ishidoshiro | |
|---|---|---|---|---|
| 2002/0061748 | A1* | 5/2002 | Nakakita et al. | 455/435 |
| 2003/0115339 | A1* | 6/2003 | Hodoshima | 709/228 |
| 2005/0132193 | A1 | 6/2005 | Ishidoshiro et al. | |
| 2005/0201557 | A1 | 9/2005 | Ishidoshiro | |
| 2006/0209773 | A1* | 9/2006 | Hundal et al. | 370/338 |
| 2006/0264227 | A1* | 11/2006 | Takahashi et al. | 455/513 |
| 2007/0091861 | A1* | 4/2007 | Gupta et al. | 370/338 |
| 2008/0175166 | A1* | 7/2008 | Oerton | 370/254 |

FOREIGN PATENT DOCUMENTS

| JP | 2004-215232 | | 7/2004 |
|---|---|---|---|
| JP | 2004-328274 | A | 11/2004 |
| JP | 2004-356928 | A | 12/2004 |
| JP | 2005-167696 | A | 6/2005 |
| JP | 2005-175524 | | 6/2005 |

* cited by examiner

*Primary Examiner* — Wing Chan
*Assistant Examiner* — Hitesh Patel
(74) *Attorney, Agent, or Firm* — Cowan, Liebowitz & Latman, P.C.

(57) ABSTRACT

A communication apparatus determines an opposing communication apparatus with which to perform an automatic setting process of automatically setting a communication parameter required for connecting to a network, and acquires the communication parameter from the opposing communication apparatus. The opposing communication apparatus is determined based on at least one of information on an authentication method and information on an encryption protocol of respective communication apparatuses, included in a signal transmitted from each of a plurality of communication apparatuses.

6 Claims, 11 Drawing Sheets

FIG. 4

| No. | SSID | AUTHENTICATION METHOD | ENCRYPTION PROTOCOL | AUTOMATIC SETTING COMPLETED | MESSAGE RECEIVED |
|---|---|---|---|---|---|
| 1 | AP-102 | OPEN | WEP | Yes | No |
| 2 | AP-103 | WPA | TKIP | Yes | No |
| 3 | AP-104 | WPA | TKIP | No | — |

FIG. 11

| No. | SSID | AUTHENTICATION METHOD | ENCRYPTION PROTOCOL | AUTOMATIC SETTING COMPLETED | MESSAGE RECEIVED | DETAILED DEVICE INFORMATION |
|---|---|---|---|---|---|---|
| 1 | AP-102 | OPEN | WEP | Yes | No | DEVICE TYPE = AP<br>MAC=aa:bb:cc:dd:ee:ff |
| 2 | AP-103 | WPA | TKIP | Yes | No | DEVICE NAME = "My AP"<br>DEVICE TYPE= "AP" |
| 3 | AP-104 | WPA | TKIP | No | — | VENDER NAME = "XXX"<br>MODEL NAME = "TypeX" |

COMMUNICATION APPARATUS AND METHOD THEREOF THAT DETERMINE COMMUNICATION PARTNER FOR PERFORMING AUTOMATIC SETTING PROCESS OF COMMUNICATION PARAMETER

BACKGROUND OF THE INVENTION

1. Field of the Invention

The present invention relates to a communication apparatus and communication parameter setting method for automatically setting communication parameters.

2. Description of the Related Art

The spread of wireless local area networks (LANs) has seen an increasing demand for technologies that simplify the setting of communication parameters required for wireless LAN communication, such as SSIDs, encryption methods, encryption keys, authentication methods and authentication keys, which users find complicated.

This demand has resulted in venders of wireless LAN devices installing methods for automatically setting communication parameters in their products in an attempt to simplify the setting of communication parameters (e.g., see Japanese Patent Laid-Open No. 2004-215232). An automatic communication parameter setting method is a method for automatically setting communication parameters using predetermined procedures and messages between connected devices. Here, an exemplary automatic communication parameter setting method will be described below.

Firstly, a device that provides communication parameters (hereinafter, "providing device") constructs a network for automatically setting communication parameters, using a prestored SSID for setting communication parameters.

On the other hand, a device that acquires communication parameters (hereinafter, "acquiring device") prestores the same SSID for setting communication parameters as the providing device, and detects and participates in the network constructed by the providing device based on the SSID.

Next, the providing device in the network for automatically setting communication parameters automatically generates communication parameters for use in normal data communication, and transmits the generated communication parameters to the acquiring device. The acquiring device, on receiving the communication parameters for use in data communication transmitted by the providing device, then sets the communication parameters therein.

Data communication is thereby enabled by newly constructing a data communication network between the devices.

Using the foregoing setting method enables communication parameters for data communication to be changed whenever automatic communication parameter setting is performed, improving security in comparison to when the communication network is always constructed with fixed values.

There is also a method that involves the acquiring device acquiring status information from a nearby device and participating in the network of the providing device after detecting that the providing device is in communication parameter setting mode, based on the acquired status information (e.g., see Japanese Patent Laid-Open No. 2005-175524).

However, if the devices do not prestore the same SSID, the conventional method that involves storing SSIDs cannot be applied.

In this case, automatic communication parameter setting can be successfully performed as a result of the acquiring device participating, in turn, in all of the networks constructed by devices present in the vicinity thereof, and trying to perform automatic communication parameter setting.

However, if there are a large number of devices in the vicinity thereof, the acquiring device ends up repeatedly performing the automatic setting process with devices other than the providing device, requiring a great deal of time until the automatic setting process is successfully performed.

With the above-mentioned method that involves acquiring status information, the automatic communication parameter setting process ends up being performed with unsuitable devices if there is a plurality of devices in communication parameter setting mode.

SUMMARY OF THE INVENTION

An object of the present invention is to quickly and precisely perform an automatic setting process of automatically setting communication parameters required for connecting to a network.

According to one aspect of the present invention, a communication apparatus is provided that includes a determination unit configured to determine a partner apparatus with which to perform an automatic setting process of automatically setting a communication parameter required for connecting to a network; and an acquisition unit configured to acquire the communication parameter from the partner apparatus determined by the determination unit, wherein the determination unit determines the partner apparatus based on at least one of information on an authentication method and information on an encryption protocol of respective communication apparatuses, included in a signal transmitted from each of a plurality of communication apparatuses.

According to another aspect of the present invention, a communication parameter setting method is provided that is executed in a communication apparatus and includes determining a partner apparatus with which to perform an automatic setting process of automatically setting a communication parameter required for connecting to a network; and acquiring the communication parameter from the partner apparatus determined in the determining step, wherein, in the determining step, the partner apparatus is determined based on at least one of information on an authentication method and information on an encryption protocol of a nearby communication apparatus, included in a signal transmitted from the nearby communication apparatus.

Further features of the present invention will become apparent from the following description of exemplary embodiments (with reference to the attached drawings).

BRIEF DESCRIPTION OF THE DRAWINGS

FIG. 4 shows an exemplary configuration of a setting process storage table in the first embodiment.

FIG. 11 shows an exemplary configuration of a setting process storage table in the second embodiment.

DESCRIPTION OF THE EMBODIMENTS

Hereinafter, preferred embodiments for implementing the invention will be described in detail with reference to the drawings.

First Embodiment

Figure 1:
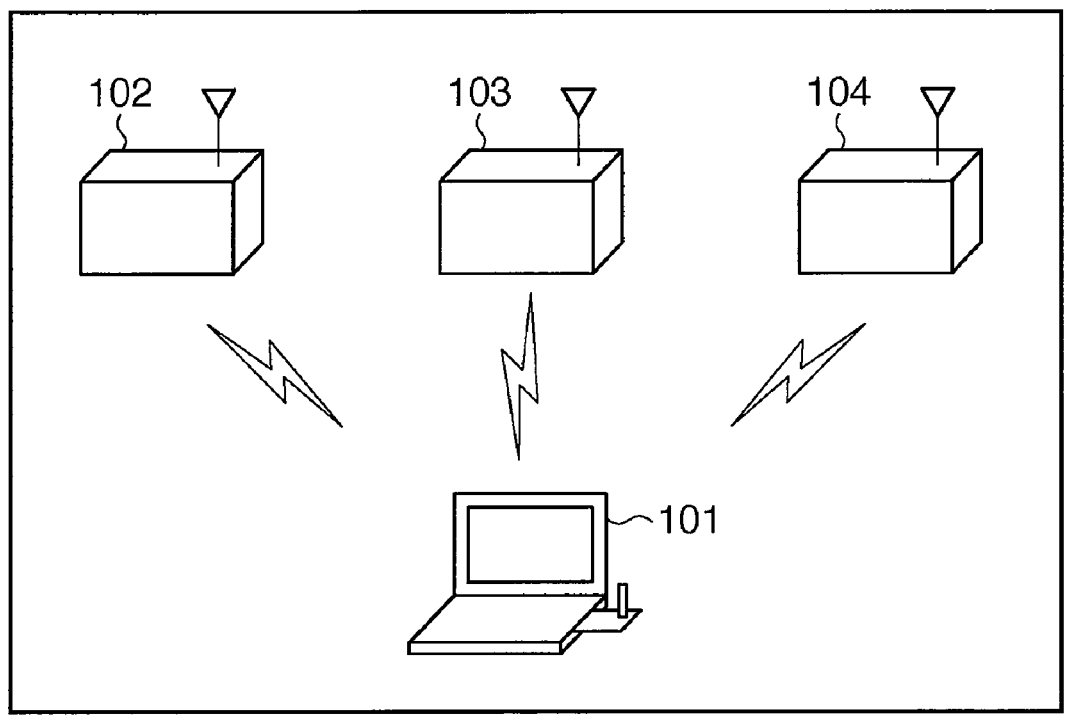
FIG. 1 shows a configuration of a wireless LAN system in a first embodiment.

FIG. 1 shows a configuration of a wireless LAN system in a first embodiment. This wireless LAN system is provided with a wireless communication terminal 101, and three wireless base stations 102, 103 and 104. These apparatuses each have an IEEE 802.11x wireless LAN communication function, and perform wireless communication using wireless LAN infrastructure communication.

The wireless communication terminal 101 and the wireless base station 104 are provided with a function of automatically setting communication parameters, with the wireless communication terminal 101 acquiring communication parameters from the wireless base station 104 using the automatic setting function.

Note that in the first embodiment, the authentication method in the wireless base station 102 is set to Open and the encryption protocol is set to WEP (Wired Equivalent Privacy), while the authentication method in the wireless base stations 103 and 104 is set to WPA (Wi-Fi Protected Access), and the encryption protocol is set to TKIP (Temporal Key Integrity Protocol).

Also, while there is one wireless communication terminal and three wireless base stations in the example shown in FIG. 1, the number of apparatuses is not limited to this.

Figure 2:
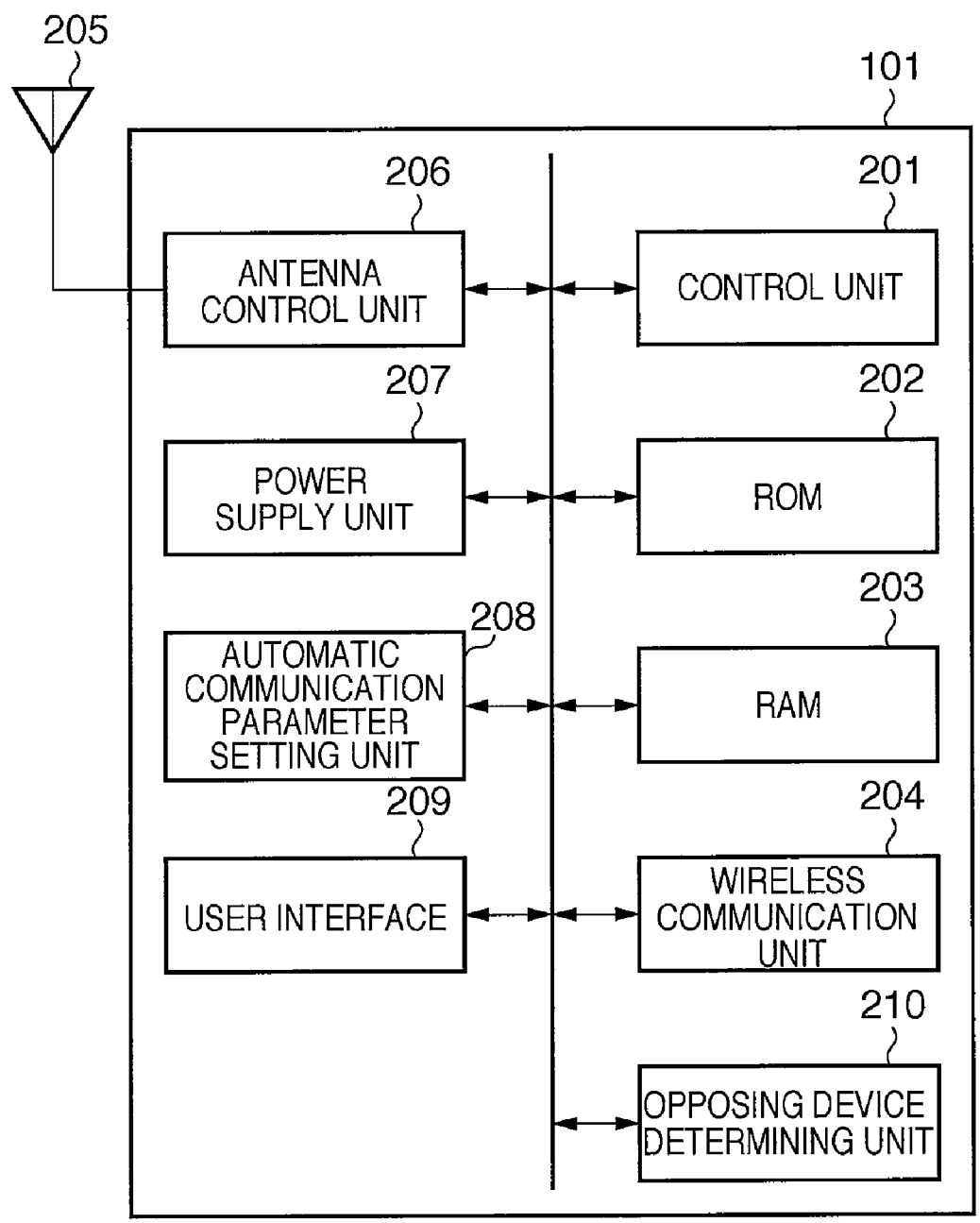
FIG. 2 is a block diagram showing an exemplary configuration of a wireless communication terminal in the first embodiment.

FIG. 2 is a block diagram showing an exemplary configuration of a wireless communication terminal in the first embodiment. In FIG. 2, reference numeral 201 denotes a control unit that controls the wireless communication terminal 101. Reference numeral 202 denotes a ROM in which control instructions, that is, computer programs are stored. Reference numeral 203 denotes a RAM. Reference numeral 204 denotes a wireless communication unit that performs communication controls of the wireless LAN communication function. Reference numeral 205 denotes an antenna. Reference numeral 206 denotes an antenna control unit. Reference numeral 207 denotes a power supply unit. Reference numeral 208 denotes an automatic communication parameter setting unit. Reference numeral 209 denotes a user interface. Reference numeral 210 denotes an opposing device (a partner device) determining unit that determines an opposing communication apparatus (wireless base stations 102-104) with which to perform the automatic communication parameter setting process.

Figure 3:
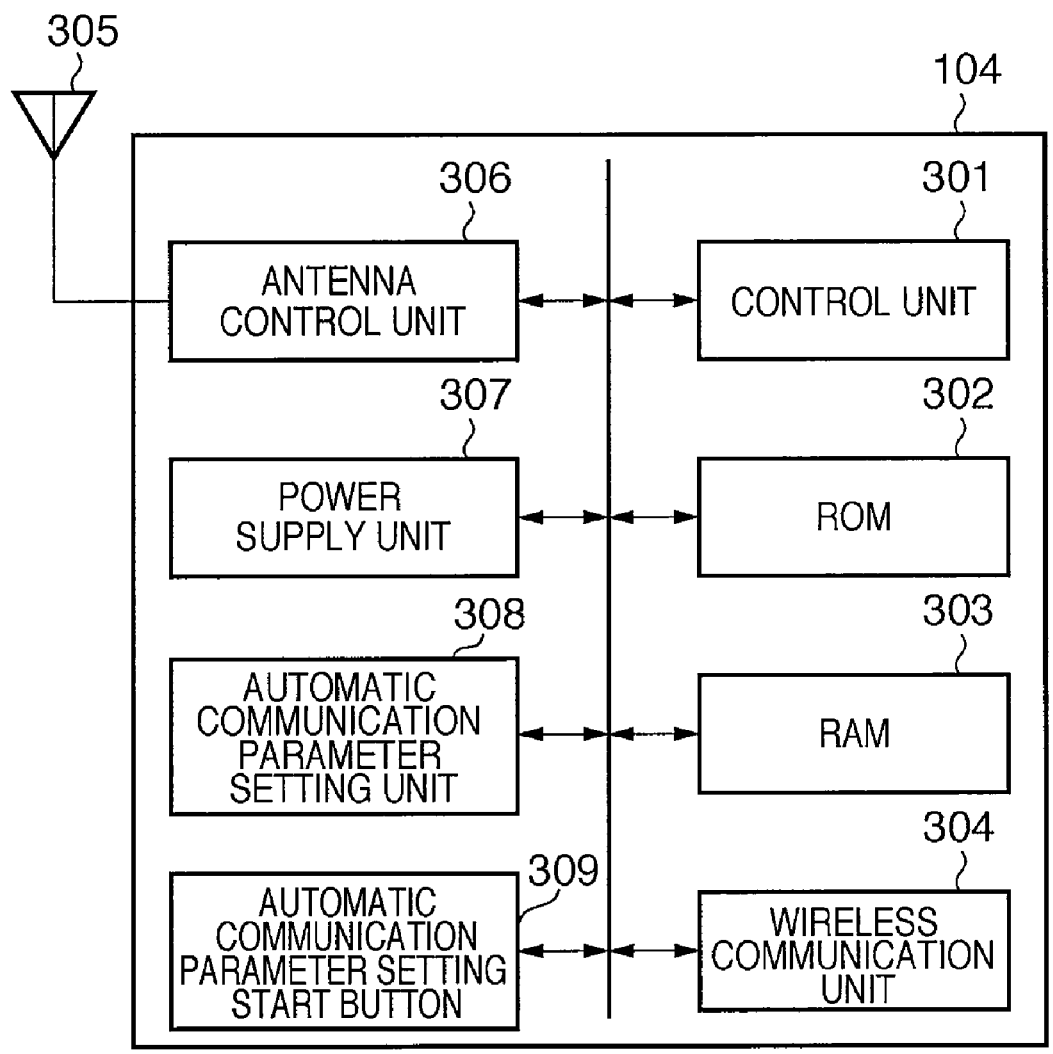
FIG. 3 is a block diagram showing an exemplary configuration of a wireless base station in the first embodiment.

FIG. 3 is a block diagram showing an exemplary configuration of a wireless base station in the first embodiment. Note that the configurations of the wireless base stations 102 to 104 are similar, with the wireless base station 104 being described here as an example.

In FIG. 3, reference numeral 301 denotes a control unit that controls the wireless base station 104. Reference numeral 302 denotes a ROM in which control instructions, that is, computer programs are stored. Reference numeral 303 denotes a RAM. Reference numeral 304 denotes a wireless communication unit that performs communication controls of the wireless LAN communication function. Reference numeral 305 denotes an antenna. Reference numeral 306 denotes an antenna control unit. Reference numeral 307 denotes a power supply unit. Reference numeral 308 denotes an automatic communication parameter setting unit. Reference numeral 309 denotes an automatic communication parameter setting start button, with the automatic communication parameter setting process being initiated by pressing this button 309.

FIG. 4 shows an exemplary configuration of a setting process storage table in the first embodiment. Note that the setting process storage table is stored in the RAM 203 of the wireless communication terminal 101.

The setting process storage table shown in FIG. 4 stores the authentication methods, encryption protocols, automatic setting completed information, and message received information of nearby wireless base stations, with the SSID of the respective wireless base stations as keys. Note that an SSID is a network identifier for identifying a network formed by a wireless base station. Here, information showing whether the automatic communication parameter setting process has been performed (Yes) or not (No) with a wireless base station is stored in the automatic setting completed information. Information showing whether a message related to the automatic communication parameter setting process has been received (Yes) or not (No) from a wireless base station with respect to which the automatic setting process has been completed (Yes) is stored in the message received information. Here, if the message received information is "Yes", this shows that a message is recorded in the RAM 203. Note that this message does not include a response message to a request to participate in the network of the respective wireless base station.

Next, the automatic communication parameter setting process performed by the wireless communication terminal 101 will be described using FIG. 5. Note that this setting process is initiated when the user performs an operation to start the automatic communication parameter setting process via the user interface 209.

Figure 5:
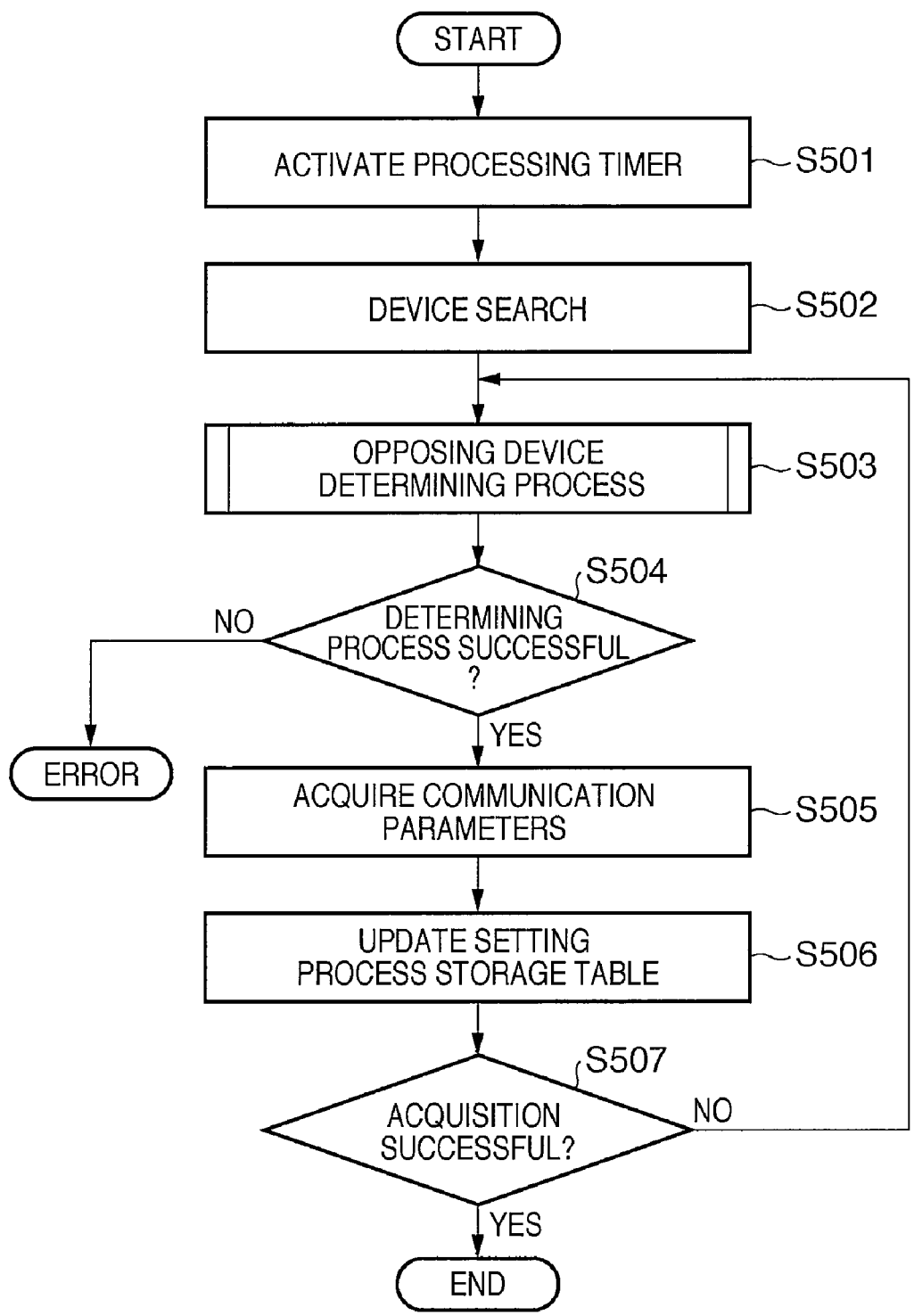
FIG. 5 is a flowchart showing an automatic communication parameter setting process of a wireless communication terminal 101.

FIG. 5 is a flowchart showing the automatic communication parameter setting process of the wireless communication terminal 101. Firstly, in step S501, the automatic communication parameter setting unit 208 activates a processing timer. After activating the processing timer, the automatic communication parameter setting unit 208, at step S502, activates the wireless communication unit 204 and searches for nearby wireless base stations. If, as a result of the search, a wireless base station is detected, the automatic communication parameter setting unit 208 registers the authentication method, encryption protocol and the like in the setting process storage table shown in FIG. 4, with the SSID of the transmission source included in the wireless signal from the wireless base station as a key.

Note that if the processing timer expires before a wireless base station is detected, the automatic communication parameter setting unit 208 aborts the automatic communication parameter setting process.

Next, in step S503, the automatic communication parameter setting unit 208 activates the opposing device determining unit 210, and waits for the opposing device determining process (detailed below using FIG. 6) performed by the opposing device determining unit 210 to end. Then, once the automatic communication parameter setting unit 208 has received the processing result from the opposing device determining unit 210, the processing proceeds to step S504, and the automatic communication parameter setting unit 208 checks the result of the opposing device determining process. Here, if the processing was successful the processing proceeds to step S505, while if the processing failed the automatic communication parameter setting process is aborted.

Next, in step S505, the automatic communication parameter setting unit 208 connects to the wireless base station determined in step S503, and acquires communication parameters from the wireless base station. In step S506, the automatic communication parameter setting unit 208 then updates the information on the wireless base station recorded in the setting process storage table shown in FIG. 4. Specifically, the automatic communication parameter setting unit 208 sets the automatic setting completed information to "Yes", and further records message received information based on the processing result.

Once the table has been updated, the automatic communication parameter setting unit 208, in step S507, confirms whether communication parameters were able to be acquired from the wireless base station. Here, if communication parameters were able to be acquired, the automatic communication parameter setting unit 208 stores the acquired communication parameters in the RAM 203, and ends the automatic communication parameter setting process. If communication parameters were not able to be acquired, the processing returns to step S503, and the opposing device determining process is executed again.

The above procedure results in the automatic communication parameter setting process being performed between the wireless communication terminal 101 and a wireless base station.

Next, the opposing device determining process performed at step S503 shown in FIG. 5 will be described using FIG. 6.

Figure 6:
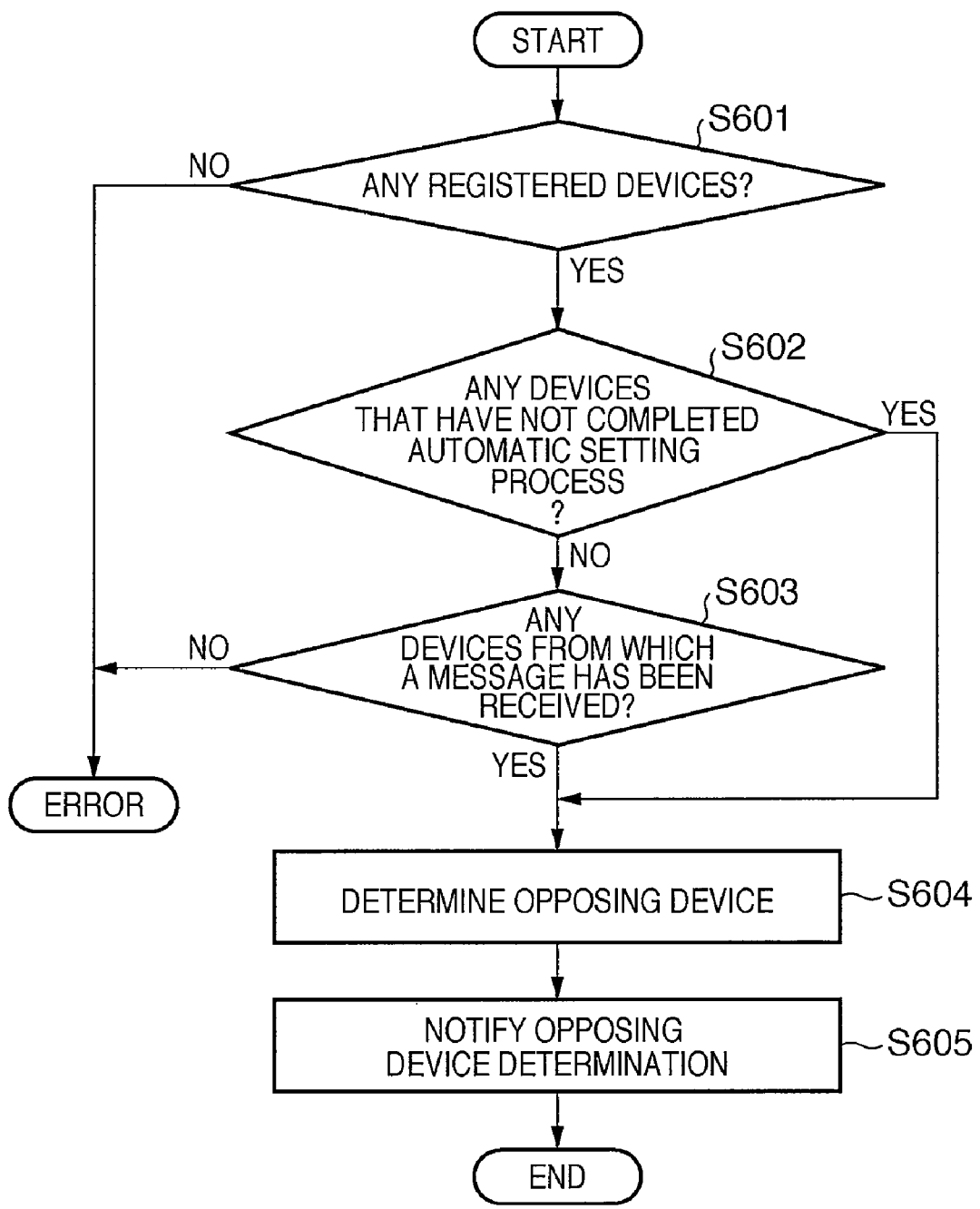
FIG. 6 is a flowchart showing an opposing device determining process in the first embodiment.

FIG. 6 is a flowchart showing the opposing device determining process in the first embodiment. Firstly, in step S601, the opposing device determining unit 210 checks whether any wireless base stations are registered in the setting process storage table. Here, if one or more wireless base stations are registered the processing proceeds to step S602, and if no wireless base stations are registered the processing is aborted.

In step S602, the opposing device determining unit 210 checks the automatic setting completed information of each wireless base station registered in the setting process storage table shown in FIG. 4. Here, if all of the wireless base stations registered in the setting process storage table have performed the automatic communication parameter setting process, the processing proceeds to step S603. However, if any of the wireless base stations have not performed the automatic communication parameter setting process, the processing proceeds to step S604.

In step S603, the opposing device determining unit 210 checks the message received information of each wireless base station registered in the setting process storage table shown in FIG. 4. Here, if a processing message has not been received from any of the wireless base stations registered in the setting process storage table, the processing is aborted. On the other hand, if a processing message has been received from one or more of the wireless base stations, the processing proceeds to step S604.

Next, in step S604, the opposing device determining unit 210 determines a wireless base station with which to preferentially perform the automatic communication parameter setting process, from among those wireless base stations with which the automatic communication parameter setting process has not been performed or those wireless base stations from which a message has been received. In the first embodiment, first preference is given to a wireless base station that uses WPA authentication. If there are only wireless base stations using Open authentication, first preference is given to a wireless base station using WEP encryption.

Note that if a plurality of wireless base stations are determined as first preferences, the wireless base station with the lowest registration number in the setting process storage table is given first preference.

Next, in step S605, the opposing device determining unit 210 notifies the most preferential wireless base station determined in step S604 to the automatic communication parameter setting unit 208 as the opposing device, and ends the processing.

The above procedure results in the opposing device determining process of the first embodiment being performed by the opposing device determining unit 210.

Next, the automatic communication parameter setting process performed between the wireless communication terminal 101 and the wireless base stations 103 and 104 will be described using FIG. 7. This example shows a sequence in the case where the automatic communication parameter setting start button 309 is pressed in the wireless base station 104, and the wireless base station 104 is compatible with the automatic communication parameter setting method.

Figure 7:
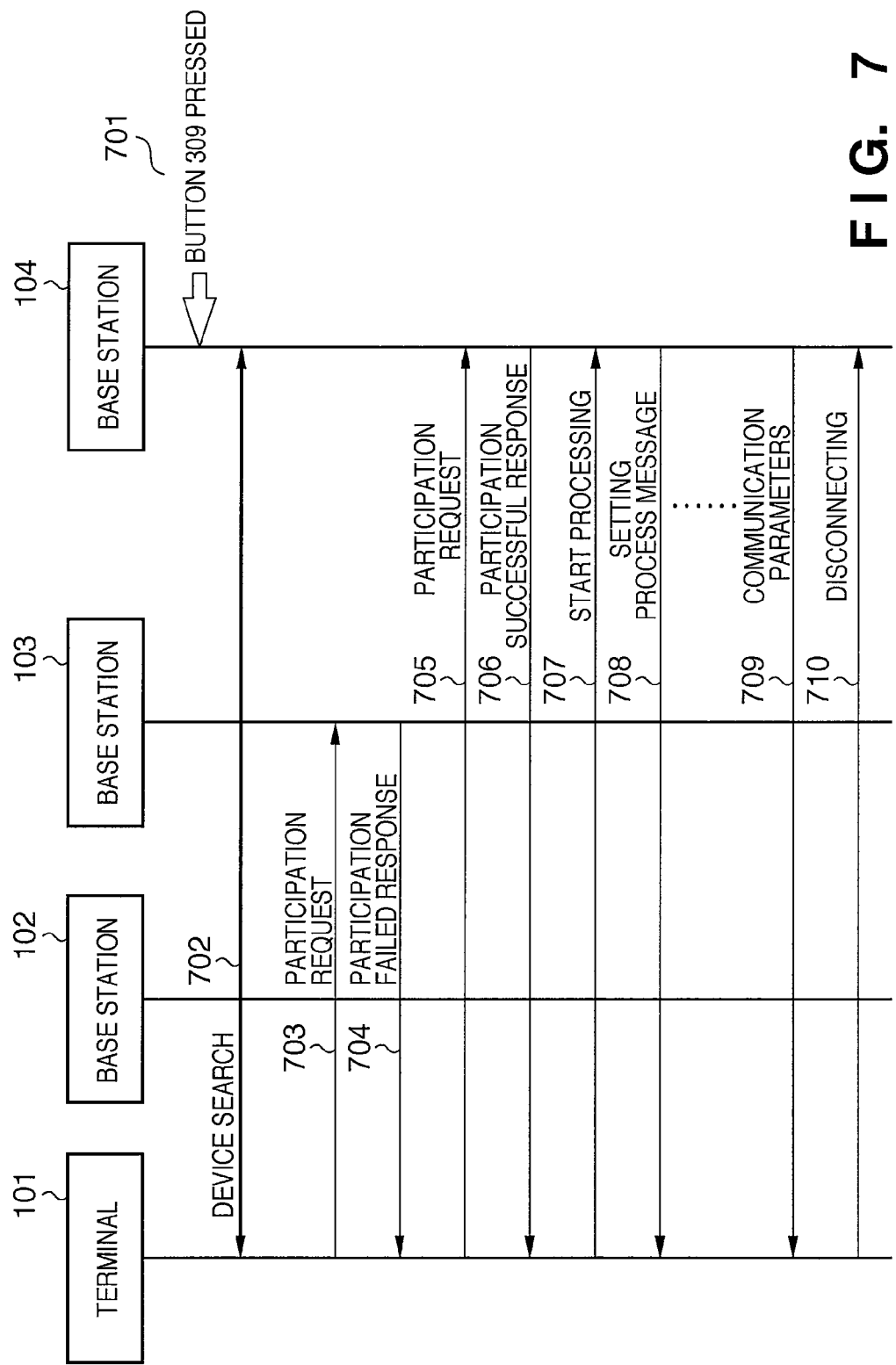
FIG. 7 shows a sequence of the automatic communication parameter setting process in the case where an automatic communication parameter setting start button 309 is pressed.

FIG. 7 shows a sequence of the automatic communication parameter setting process in the case where the automatic communication parameter setting start button 309 is pressed. Once the automatic communication parameter setting start button 309 in the wireless base station 104 is pressed (701), the automatic communication parameter setting unit 308 starts the automatic communication parameter setting process.

After starting the automatic communication parameter setting process, the wireless communication terminal 101 searches for nearby devices (702), and registers information on each wireless base station in the setting process storage table. Note that in the first embodiment, the registration number of the wireless base station 103 in the setting process storage table is lower than the registration number of the wireless base station 104.

After the device search, the wireless communication terminal 101 performs the opposing device determining process, and determines the wireless base station 103 to be the device with which to preferentially perform processing. After the opposing device determining process, the wireless communication terminal 101 transmits a participation request message (703) to the wireless base station 103. Here, the wireless base station 103 is not compatible with the automatic communication parameter setting method, and is set to WPA authentication. Therefore, the wireless base station 103, on receiving the participation request message from the wireless communication terminal 101, tries to perform a handshake process for setting an authentication key with the wireless communication terminal 101. In this case, the handshake process fails since the wireless communication terminal 101 does not have the parameters required for connecting to the wireless base station 103, and the wireless base station 103 transmits a participation failed response message (704) to the wireless communication terminal 101.

After receiving the participation failed response message (704) from the wireless base station 103, the wireless communication terminal 101 updates the setting process storage table. Then, the wireless communication terminal 101 again performs the opposing device determining process, and determines the wireless base station 104 to be the device with which to preferentially perform processing. After the opposing device determining process, the wireless communication terminal 101 transmits a participation request message (705) to the wireless base station 104.

On the other hand, the wireless base station 104, being compatible with the automatic communication parameter setting method, transmits a participation successful response message (706) to the wireless communication terminal 101. On receiving the participation successful response message (706), the wireless communication terminal 101 transmits a start processing message (707) to start the communication parameter acquiring process.

On receipt of the start processing message (707), the wireless base station 104 exchanges a setting process message (708) with the wireless communication terminal 101 in accordance with a predetermined procedure. Finally, communication parameters (709) required for participating in the data communication network of the wireless base station 104 are transmitted to the wireless communication terminal 101.

On receiving the communication parameters (709), the wireless communication terminal 101 saves the communication parameters (709) to the RAM 203, and ends the processing after transmitting a message (710) indicating that it is disconnecting from the network of the wireless base station 104.

The above procedure results in the automatic communication parameter setting process being performed between the wireless communication terminal 101 and a wireless base station compatible with the automatic communication parameter setting method.

Next, the automatic communication parameter setting process performed between the wireless communication terminal 101 and the wireless base station 102 set to Open authentication will be described using FIG. 8.

Figure 8:
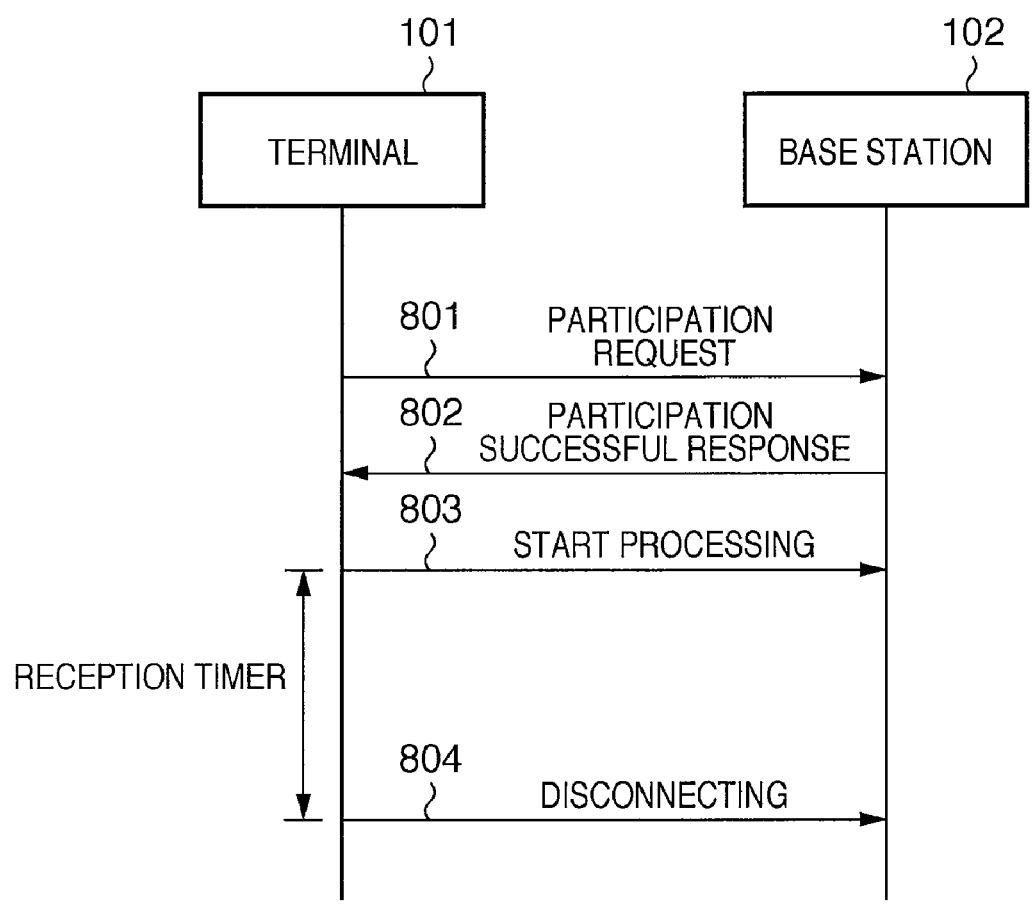
FIG. 8 shows a sequence of the automatic communication parameter setting process performed with a wireless base station 102.

FIG. 8 shows a sequence of the automatic communication parameter setting process performed with the wireless base station 102. The wireless communication terminal 101 firstly transmits a participation request message (801) to the wireless base station 102. On the other hand, the wireless base station 102, being set to Open authentication, transmits a participation successful response message (802) to the wireless communication terminal 101.

On receiving the participation successful response message (802), the wireless communication terminal 101 then transmits a start processing message (803) to start the communication parameter acquiring process.

Here, the wireless base station 102, not being compatible with the automatic communication parameter setting method, does not respond to the start processing message. As a result, a message reception timer activated when the start processing message was transmitted expires in the wireless communication terminal 101, and the wireless communication terminal 101 transmits a message (804) indicating that it is disconnecting from the network of the wireless base station 102.

The time required until the automatic communication parameter setting process with the wireless base station 102 fails depends on the time it takes until the message reception timer expires. Generally, it takes the timer longer to expire than the time required for the WPA handshake process to fail. Therefore, the automatic communication parameter setting process with a wireless base station set to WPA authentication is preferentially performed. This enables the time required for failures in the automatic communication parameter setting process to occur from the start of processing before being successfully performed to be shortened.

The automatic communication parameter setting process is often generally performed with the object of acquiring security setting information such as encryption keys and the like required for communication. Therefore, with the opposing device determining process, a device using WEP encryption is preferentially set as the opposing device over a device in which an encryption protocol is not set. The possibility of the automatic communication parameter setting process with a desired device being completed quickly is thereby increased, and usability is improved.

Next, processing when acquisition of communication parameters from the wireless base station 104 fails will be described using FIG. 9.

Figure 9:
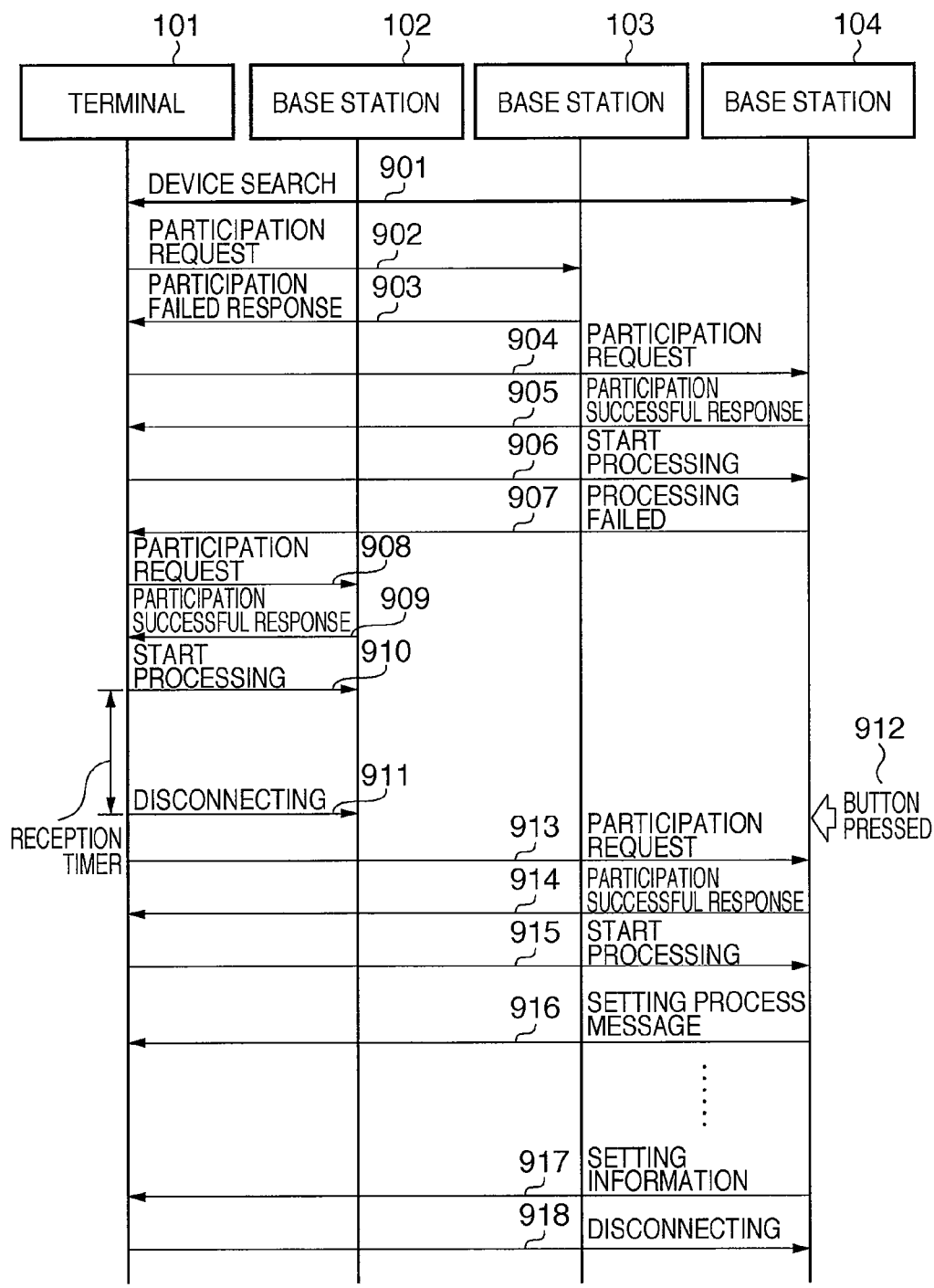
FIG. 9 shows a sequence when acquisition of communication parameters from a wireless base station 104 fails.

FIG. 9 shows a sequence when acquisition of communication parameters from the wireless base station 104 fails. After starting the automatic communication parameter setting process, the wireless communication terminal 101 searches for nearby wireless base stations (901), and registers information on each wireless base station in the setting process storage table. Here, the registration number of the wireless base station 103 in the setting process storage table is lower than the registration number of the wireless base station 104.

After the device search, the wireless communication terminal 101 performs the opposing device determining process, and determines the wireless base station 103 to be the device with which to preferentially perform processing. After the opposing device determining process, the wireless communication terminal 101 transmits a participation request message (902) to the wireless base station 103. Here, the wireless base station 103 transmits a participation failed response message (903) to the wireless communication terminal 101.

After receiving the participation failed response message (903) from the wireless base station 103, the wireless communication terminal 101 updates the setting process storage table. Then, the wireless communication terminal 101 again performs the opposing device determining process, and determines the wireless base station 104 to be the device with which to preferentially perform processing. After the opposing device determining process, the wireless communication terminal 101 transmits a participation request message (904) to the wireless base station 104.

The wireless base station 104, on the other hand, transmits a participation successful response message (905) to the wireless communication terminal 101. On receiving the participation successful response message (905), the wireless communication terminal 101 transmits a start processing message (906) to the wireless base station 104 to start the communication parameter acquiring process.

Here, the wireless base station 104 transmits a processing failed message (907) to the wireless communication terminal 101, since the automatic communication parameter setting process has not been started.

After receiving the processing failed message from the wireless base station 104, the wireless communication terminal 101 updates the setting process storage table. Then, the wireless communication terminal 101 again performs the opposing device determining process, and determines the wireless base station 102 to be the device with which to preferentially perform processing. After the opposing device determining process, the wireless communication terminal 101 transmits a participation request message (908) to the wireless base station 102.

The wireless base station 102, on the other hand, transmits a participation successful response message (909) to the wireless communication terminal 101. On receiving the participation successful response message (909), the wireless communication terminal 101 transmits a start processing message (910) to start the communication parameter acquiring process.

Here, the wireless base station 102, not being compatible with the automatic communication parameter setting method, does not respond to the start processing message. As a result, the message reception timer activated when the start processing message was transmitted expires in the wireless communication terminal 101, and the wireless communication terminal 101 disconnects from the network of the wireless base station 102 (911).

Then, the automatic communication parameter setting start button of the wireless base station 104 is pressed (912), and the automatic communication parameter setting process of the wireless base station 104 is started.

After disconnecting from the network of the wireless base station 102, the wireless communication terminal 101 updates the setting process storage table. Then, the wireless communication terminal 101 again performs the opposing device determining process, and determines the wireless base station 104 to be the device with which to preferentially perform processing, with reference to the message received information in the setting process storage table. After the opposing device determining process, the wireless communication terminal 101 transmits a participation request message (913) to the wireless base station 104.

On the other hand, the wireless base station 104, being compatible with the automatic communication parameter setting method, transmits a participation successful response message (914) to the wireless communication terminal 101. On receiving the participation successful response message (914), the wireless communication terminal 101 transmits a start processing message (915) to start the communication parameter acquiring process.

On receipt of the start processing message (915), the wireless base station 104 exchanges a setting process message (916) with the wireless communication terminal 101 in accordance with a predetermined procedure. Finally, communication parameters (917) required for participating in the data communication network of the wireless base station 104 are transmitted to the wireless communication terminal 101.

On receiving the communication parameters (917), the wireless communication terminal 101 saves the communication parameters (917) to the RAM 203, and ends the processing after transmitting a message (918) indicating that it is disconnecting from the network of the wireless base station 104.

The first embodiment enables an automatic communication parameter setting process to be quickly retried with an appropriate wireless base station, even in the case where the setting process fails due, for instance, to the wireless base station having not started the automatic communication parameter setting process.

Second Embodiment

Next, a second embodiment according to the present invention will be described in detail with reference to the drawings. The case where detailed device information acquired from a wireless base station is used by a wireless communication terminal when determining an opposing device will be described as the second embodiment.

Note that the configurations of the wireless LAN system, the wireless communication terminal and the wireless base stations are similar to the first embodiment described using FIGS. 1, 2 and 3, and description thereof will be omitted.

Here, similarly to the first embodiment, the automatic communication parameter setting unit 208 of the wireless communication terminal 101 performs the automatic communication parameter setting process shown in FIG. 5. The automatic communication parameter setting unit 208 searches for nearby wireless base stations, and registers acquired detailed device information (FIG. 11) in a setting process storage table when a wireless base station is detected.

Here, detailed device information is information describing in detail characteristics of the respective device. Specifically, as shown in FIG. 11, the detailed device information includes at least one of device name, vender name, model name, model number, serial number, device type, MAC address and UUID (Universally Unique Identifier).

Note that the detailed device information may be appended to a search response signal sent from a wireless base station in response to a search request transmitted by the wireless communication terminal 101. Detailed device information may also be acquired by transmitting a request for detailed device information to a found wireless base station.

Further, condition information specifying an opposing device with which to perform the automatic communication parameter setting process is set in the RAM 203 of the wireless communication terminal 101. Device name, vender name, model name, model number, serial number, device type, MAC address, UUID or the like may be used for the condition information, and this information may be enumerated.

For example, if the user wants to designate an access point of a Company A as the opposing device, "Vender Name=Company A" and "Device Type=AP" are set as condition information.

Next, an opposing device determining process for determining an opposing device based on the detailed device information will be described using FIG. 10.

Figure 10:
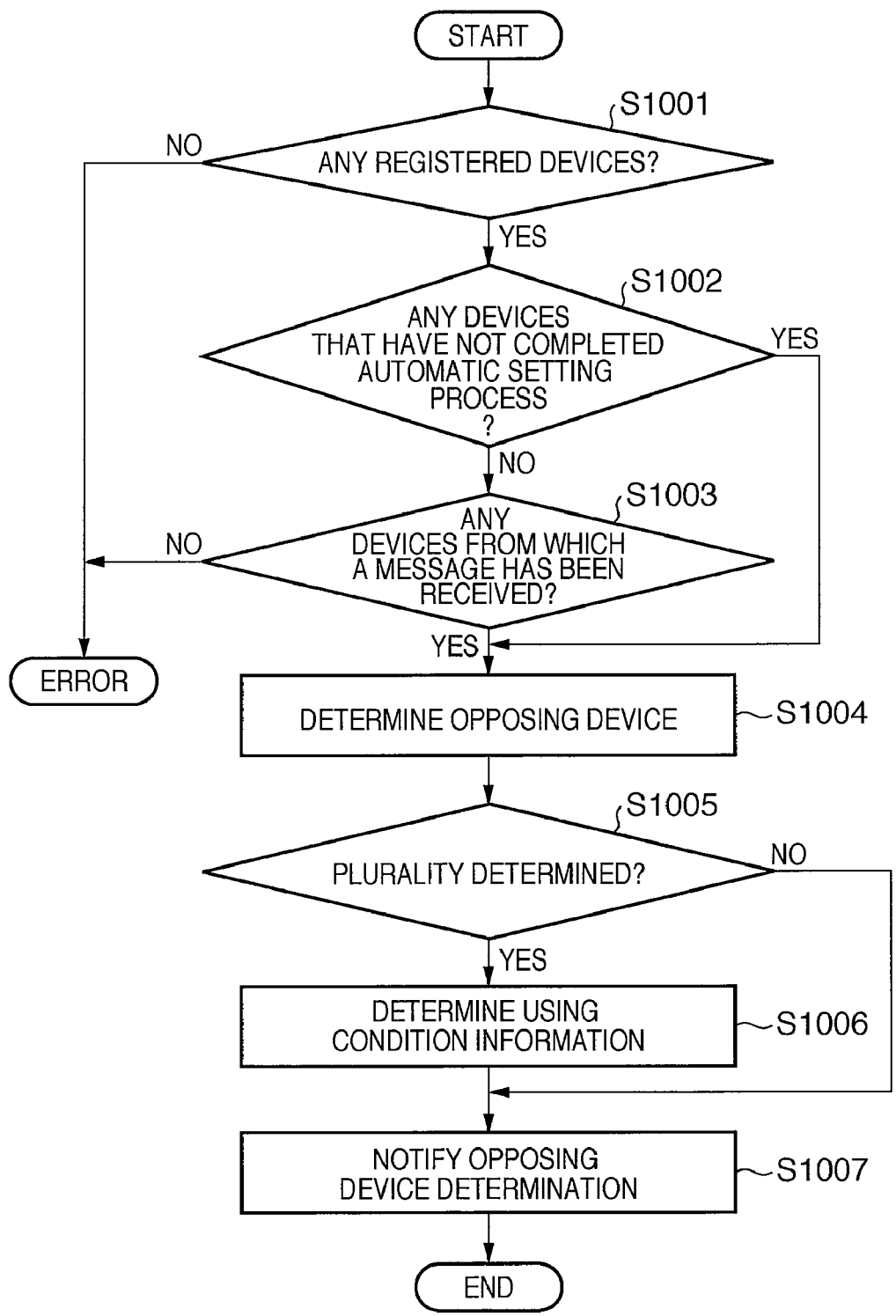
FIG. 10 is a flowchart showing an opposing device determining process in a second embodiment.

FIG. 10 is a flowchart showing the opposing device determining process in the second embodiment. Firstly, in step S1001, the opposing device determining unit 210 checks whether any wireless base stations are registered in the setting process storage table. Here, if one or more wireless base stations are registered the processing proceeds to step S1002, and if no wireless base stations are registered the processing is aborted.

In step S1002, the opposing device determining unit 210 checks the automatic setting completed information of each wireless base station registered in the setting process storage table in FIG. 4. Here, if all of the wireless base stations registered in the setting process storage table have performed the automatic communication parameter setting process, the processing proceeds to step S1003. However, if any of the wireless base stations have not performed the automatic communication parameter setting process, the processing proceeds to step S1004.

In step S1003, the opposing device determining unit 210 checks the message received information of each wireless base station registered in the setting process storage table. Here, if a processing message has not been received from any of the wireless base stations registered in the setting process storage table, the processing is aborted. On the other hand, if a processing message has been received from one or more of the wireless base stations, the processing proceeds to step S1004.

Next, in step S1004, the opposing device determining unit 210 determines a wireless base station with which to preferentially perform the automatic communication parameter setting process, from among those wireless base stations with which the automatic communication parameter setting process has not been performed or those wireless base stations from which a message has been received. In the second embodiment, first preference is given to a wireless base station that uses WPA or WPA2 authentication. If there are only wireless base stations using Open authentication, first preference is given to a wireless base station using WEP encryption. If there are no wireless base stations that meet these criteria, first preference is given to a wireless base station in which an encryption protocol is not set.

Next, in step S1005, the opposing device determining unit 210 checks whether a plurality of devices have been determined as first preference. The processing proceeds to step S1006 if there are a plurality of devices determined as first preference, and to step S1007 if there is only one device.

In step S1006, the opposing device determining unit 210 acquires the condition information from the RAM 203, and checks whether there is a wireless base station having an item that matches the condition information, based on the detailed device information registered in the setting process storage table. If there is one wireless base station having an item that matches the condition information, the processing proceeds to step S1007, with first preference given to that wireless base station.

If there is either a plurality of a wireless base stations having an item that matches the condition information or no devices with a matching item, the processing proceeds to step S1007, with first preference being given to the device with the lowest registration number in the setting process storage table.

Note that in the second embodiment, if there is one wireless base station having an item that matches the condition information, first preference is given to that wireless base station, although first preference may be given to the wireless base station having the most items matching the condition information.

In step S1007, the opposing device determining unit 210 then notifies the wireless base station determined as first preference to the automatic communication parameter setting unit 208 as the opposing device, and ends the processing.

The above procedure results in the opposing device determining process of the second embodiment being performed by the opposing device determining unit 210.

The second embodiment enables a desired wireless base station to be quickly determined as the opposing device, and automatic communication parameter setting to be promptly performed successfully.

As described above, an opposing communication device with which to perform the automatic communication parameter setting process can be determined after eliminating those devices with which the automatic setting process would clearly fail. Therefore, the time required until the automatic setting process is successfully performed is reduced, and usability is improved.

Note that the present invention may be applied to a system constituted by a plurality of devices (e.g., host computer, interface device, reader, printer, etc.) or an apparatus composed of a single device (e.g., copier, facsimile machine, etc.).

A recording medium with the program code of software for realizing the functions of the foregoing embodiments recorded thereon may be supplied to a system or an apparatus, and the program code stored on the recording medium may be read out and executed by a computer (CPU or MPU) in the system or apparatus. Needless to say, the object of the present invention is thereby achieved.

In this case, the actual program code read out from the computer-readable recording medium realizes the functions of the foregoing embodiments, and the recording medium storing the program code constitutes the present invention.

Examples of recording media that can be used for supplying the program code include flexible disk, hard disk, optical disk, magneto-optical disk, CD-ROM, CD-R, magnetic tape, nonvolatile memory card, and ROM.

The foregoing embodiments are, needless to say, realized not only as a result of a computer executing the read program code, but also in the following cases. That is, an operating system or the like running on a computer may perform part or all of the actual processing based on instructions in the program code, with the functions of the foregoing embodiments being realized as a result of this processing.

Further, the program code read out from the recording medium may be written to a memory provided in a function expansion board inserted in a computer or a function expansion unit connected to a computer, and a CPU or the like provided in the function expansion board or the function expansion unit may then perform part or all of the actual processing based on instructions in the program code, with the functions of the foregoing embodiments being realized as a result of this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-201099, filed Aug. 1, 2007, which is hereby incorporated by reference herein in its entirety.

What is claimed is:

1. A communication apparatus comprising:
   a search unit which searches for nearby wireless base stations;
   a registering unit which registers at least an authentication method of respective wireless base stations searched by the search unit;
   a determination unit which determines a partner base station that the communication apparatus to preferentially requests an automatic setting process for acquiring communication parameters for connecting to a network from the partner base station, based on the authentication method of respective wireless base stations registered by the registering unit, wherein the communication parameters comprises an encryption method, an encryption key, authentication methods and an authentication key, and, in a case where a handshake process for authentication fails, time required for the determination unit to determine, as the partner base station preferentially, a base station of the authentication method with failure is shorter than a reception timer;
   a requesting unit which preferentially requests the partner base station to perform the automatic setting process; and
   an acquisition unit which acquires the communication parameters from the partner base station according to the automatic setting process requested by the requesting unit,
   wherein the determination unit determines next partner base station to perform the automatic setting process if the communication apparatus cannot acquire the communication parameters from the partner base station.

2. The communication apparatus according to claim 1, wherein the registering unit registers information on whether a message related to the automatic setting process has been received from the wireless base stations, and wherein the determination unit determines the partner base station from among wireless base stations from which the message was received.

3. The communication apparatus according to claim 1, further comprising a unit which acquires detailed device information on the wireless base stations,
wherein the determination unit determines the partner base station based on the acquired detailed device information.

4. The communication apparatus according to claim 3, wherein the detailed device information includes at least one of device name, device vender name, model name, model number, serial number, device type, MAC address and Universally Unique Identifier.

5. A communication parameter setting method executed in a communication apparatus, comprising:
searching for nearby wireless base stations;
registering an authentication method and an encryption protocol of respective wireless base stations searched in the searching step;
determining a partner base station that the communication apparatus preferentially requests an automatic setting process for acquiring a communication parameters for connecting to a network from the partner base station, based on at least one of the registered authentication method and the registered encryption protocol of respective wireless base stations registered in the registering step, wherein the communication parameters comprises an encryption method, an encryption key, authentication methods and an authentication key, and, in a case where a handshake process for authentication fails, time required for the determination step to determine, as the partner base station preferentially, a base station of the authentication method with failure is shorter than a reception timer;
preferentially requesting the partner base station to perform the automatic setting process; and
acquiring the communication parameters from the partner base station according to the automatic setting process requested in the requesting step,
wherein the determination step determines next partner base station to perform the automatic setting process if the communication apparatus cannot acquire the communication parameters from the partner base station.

6. A non-transitory computer-readable recording medium having recorded thereon a computer program for causing a computer to execute a communication parameter setting method, comprising:
searching for nearby wireless base stations;
registering an authentication method and an encryption protocol of respective wireless base stations searched in the searching step;
determining a partner base station that the communication apparatus preferentially requests an automatic setting process for acquiring a communication parameters for connecting to a network from the partner base station, based on at least one of the registered authentication method and the registered encryption protocol of respective wireless base stations registered in the registering step, wherein the communication parameters comprises an encryption method, an encryption key, authentication methods and an authentication key, and, in a case where a handshake process for authentication fails, time required for the determination step to determine, as the partner base station preferentially, a base station of the authentication method with failure is shorter than a reception timer;
preferentially requesting the partner base station to perform the automatic setting process; and
acquiring the communication parameters from the partner base station according to the automatic setting process requested in the requesting step,
wherein the determination step determines next partner base station to perform the automatic setting process if the communication apparatus cannot acquire the communication parameters from the partner base station.

* * * * *